United States Patent [19]

Reinsma

[11] 4,331,339
[45] May 25, 1982

[54] SEAL ASSEMBLY HAVING A PLASTIC ANNULAR SEALING MEMBER WITH AN INTEGRAL SEALING LIP

[75] Inventor: Harold L. Reinsma, Dunlap, Ill.

[73] Assignee: Caterpillar Tractor Co., Peoria, Ill.

[21] Appl. No.: 273,878

[22] PCT Filed: Nov. 21, 1980

[86] PCT No.: PCT/US80/01568
§ 371 Date: Nov. 21, 1980
§ 102(e) Date: Nov. 21, 1980

[51] Int. Cl.$^3$ ............... F16J 15/32; F16J 15/38
[52] U.S. Cl. .................... 277/84; 277/92; 277/95; 277/152; 305/11
[58] Field of Search ............... 277/38–43, 277/81 R, 84, 92, 95, 96, 96.1, 96.2, 152, 153, 165, 228, DIG. 6; 305/11–13

[56] References Cited

U.S. PATENT DOCUMENTS

| | | |
|---|---|---|
| Re. 24,478 | 5/1958 | Kilbourne . |
| 2,289,274 | 7/1942 | Krug . |
| 2,668,068 | 2/1954 | Bredemeier . |
| 2,814,513 | 11/1957 | Kupfert et al. |
| 3,108,816 | 10/1963 | Moore . |
| 3,291,494 | 12/1966 | Hatch et al. .......... 277/92 |
| 3,357,679 | 12/1967 | Gulick . |
| 3,515,393 | 6/1970 | Metcalfe ............. 277/96.2 |
| 3,612,538 | 10/1971 | Sievenpiper ......... 277/165 |
| 3,752,243 | 8/1973 | Hummer et al. ...... 277/92 |
| 3,774,920 | 11/1973 | Sievenpiper ......... 277/165 |
| 3,841,718 | 10/1974 | Reinsma .............. 277/95 |
| 3,878,031 | 4/1975 | Dormer .............. 277/228 |
| 3,907,310 | 9/1975 | Dufour ............... 277/92 |
| 3,940,154 | 2/1976 | Olsson ............... 277/92 |
| 3,995,868 | 12/1976 | Smith ............. 277/DIG. 6 |
| 4,066,269 | 1/1978 | Linne ................ 277/228 |
| 4,094,516 | 6/1978 | Morley et al. ........ 305/11 |
| 4,132,418 | 1/1979 | Roli ................. 277/84 |
| 4,185,842 | 1/1980 | Magara ............. 277/165 X |
| 4,195,852 | 4/1980 | Roley et al. .......... 305/11 |

FOREIGN PATENT DOCUMENTS

| | | |
|---|---|---|
| 2836795 | 2/1980 | Fed. Rep. of Germany ...... 277/84 |
| 994486 | 8/1951 | France . |
| 46-35985 | 10/1971 | Japan . |
| 575620 | 2/1946 | United Kingdom ...... 277/DIG. 6 |
| 1222609 | 2/1971 | United Kingdom . |

*Primary Examiner*—Robert S. Ward, Jr.
*Attorney, Agent, or Firm*—Phillips, Moore, Weissenberger, Lempio & Majestic

[57] ABSTRACT

End face seal assemblies (10) are commonly used in severe service environments to exclude external contaminants from joints (12) between relatively movable members (14, 22) and to retain lubricants therein. Recurring problems associated with end face seal assemblies having two piece seal rings include failure of the bond between the stiffener ring portion and the resilient sealing lip portion and resultant lubrication loss and joint failure. The present invention is an improved end face seal assembly (10) having a load ring (42) and an annular sealing member (36) including an integral sealing lip (38). The annular sealing member (36) is made of a thermoplastic resin selected from a group of resins having coefficients of friction, tensile strengths, hardnesses, and load/velocity capabilities (PV) within preselected ranges.

17 Claims, 3 Drawing Figures

SEAL ASSEMBLY HAVING A PLASTIC ANNULAR SEALING MEMBER WITH AN INTEGRAL SEALING LIP

TECHNICAL FIELD

This invention relates generally to a seal assembly and, more particularly, to an end face seal assembly including an elastomeric load ring and a plastic annular sealing member having an integral sealing lip.

BACKGROUND ART

End face seals are commonly used in severe service environments to exclude external contaminants such as grit, water, and the like from joints between relatively movable members and to retain lubricants therein. One such application for seals of this type is in the pin joints in endless track chains on track-type earthmoving vehicles. Such track chains operate in extremely abrasive environments, and the track joints may be exposed to mud, dust, sand or rock at temperatures which may reach the extremes found in either the deserts or the artic regions. Such seals perform their primary sealing function under these conditions, because the sealing portions thereof are precisely formed to mate with and sealingly engage the end faces of their associated bushings and because the annular seal rings themselves are accurately positioned and maintained under a substantial axial face load by an elastomeric load ring.

In order to function successfully under these relatively severe conditions, the seal must not only possess strength, corrosion resistance, and abrasion resistance, but also must be able to withstand the shock associated with earthmoving operations, even when carried out at subzero temperatures. In addition, it is desirable to have a seal possessing a combination of the properties of sealability, seal face stability, a low coefficient of friction and stiffness to resist deformation of the seal face or sealing lip under load. Accordingly, track seals are frequently constructed from two different materials; the sealing lip portion being formed from a relatively pliable material such as polyurethane rubber. The sealing tip is then bonded to a relatively stiff support ring formed from a polycarbonate plastic material, one type of which is available commercially under the trade name Lexan.

While end face seal assemblies having two-piece annular seal rings have demonstrated improved performance over seal assemblies of earlier designs, the requirement for a functional bond exposed to the hostile environment on one side and the lubricant on the other is an inherent weakness in the assembly. Failure of the rubber/polycarbonate bond may cause seal leakage and ultimate track joint failure. Considering the fact that there are approximately two hundred such seals on a tractor, one appreciates that a seal ring failure rate of one tenth of 1.0%, i.e. one out of every one thousand may result in premature track pin joint failure and expensive and highly undesirable downtime for one out of every five vehicles.

The foregoing illustrates limitations of the known prior art. In view of the above, it would be advantageous to provide an alternative to the prior art.

DISCLOSURE OF THE INVENTION

In one aspect of the present invention this is accomplished by providing an end face seal assembly including a one-piece plastic annular sealing member with an integral sealing lip. The sealing member possesses preselected physical properties and cooperates with an elastomeric load ring forming a seal assembly having a long life expectancy and operational effectiveness in the severe service environment of a track joint.

The foregoing and other aspects will become apparent from the following detailed description of the invention when considered in conjunction with the accompanying drawings. It is to be expressly understood, however, that the drawings are not intended as a definition of the invention but are for the purpose of illustration only.

BEST MODE FOR CARRYING OUT THE INVENTION

Figure 1:
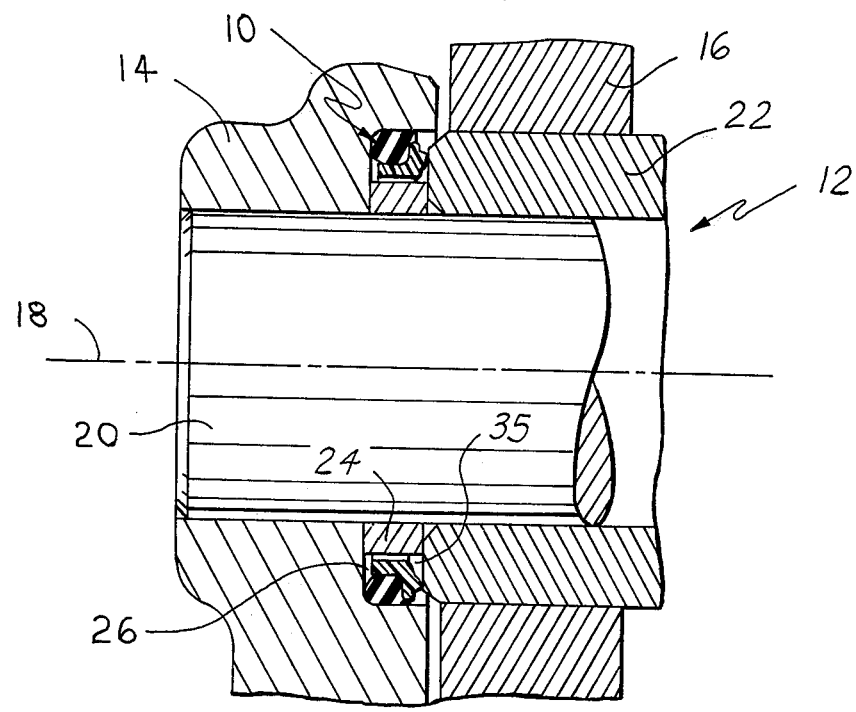
FIG. 1 is a vertical elevational view in cross section of a track joint embodying the end face seal assembly of the present invention.

While this invention has general application as an end face seal assembly for sealing between relatively movable members, for convenience of illustration the preferred embodiment will be described with reference to an end face seal assembly for sealing a track joint, although it is not intended to be limited thereto. Referring to FIG. 1, an end face seal assembly 10 constructed in accordance with the present invention is shown in association with a track point generally indicated by the numeral 12. The track joint includes first and second cooperating, pivotally interconnected overlapping links 14, 16 coaxially mounted along a pivot axis 18 to a track pin 20 and an associated cylindrical bushing 22 respectively, and a spacer ring 24 disposed intermediate the links.

Figure 2:
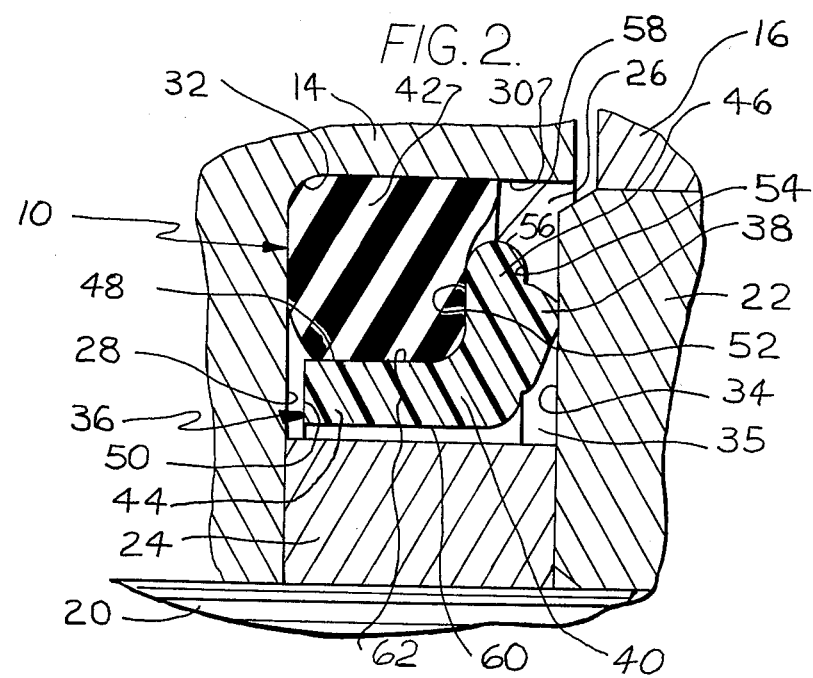
FIG. 2 is an enlarged view of the end face seal assembly and associated members of FIG. 1 to better illustrate the details thereof.

As shown in greater detail in FIG. 2, a counterbore or seat 26 is formed in the first link 14 and is defined by an axially outwardly facing end face 28, a cylindrical surface 30, and a blended arcuate corner portion 32. The spacer ring 24 is loosely positioned on the track pin 20 and abuts the face 28 and an end face 34 on the bushing 22 to limit the minimum axial distance therebetween.

The end face seal assembly 10 is disposed generally concentrically with the axis 18 within the counterbore 26 in sealing engagement with the end face 34 of the bushing 22. A lubricant retaining reservior (not shown) is disposed within the pin 20 which directs a film of lubricant through a small clearance between the pin and the link 16 and between the spacer ring 24 and the end face 34 on the bushing 22 to feed a lubricant holding chamber 35 within the seal assembly 10. The seal assembly includes an annular sealing member or seal ring shown generally at 36 for dynamic primary sealing engagement with the end face 34. The seal ring has an integral sealing lip 38 having a generally triangular cross section for engaging the bushing end face and an annular base 40 having a generally L-shaped cross-sectional configuration for supporting the sealing lip. The seal assembly further includes a annular resilient load ring 42 for supporting the seal ring in the counterbore and for providing static sealing engagement with both the support ring and the counterbore.

Figure 3:
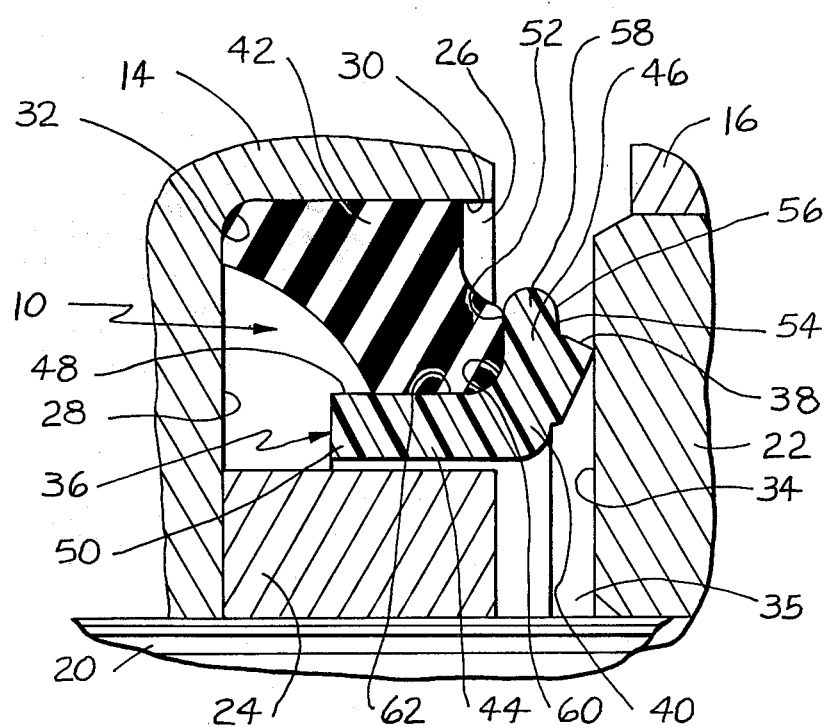
FIG. 3 is an enlarged view of the seal assembly and associated members of FIG. 1, illustrating the seal assembly in the unloaded position or free state.

Referring now to FIGS. 2 and 3, the load ring 42 and the seal ring 36 are illustrated in greater detail. The load ring is preferably constructed of an elastomeric resilient material, for example, rubber. The free cross section thereof is of a generally parallelogram shaped configuration of preselected dimensions and is secured within the counterbore or seat 26, for example by a slight press fit at surface 30. When loaded the load ring directs positive sealing engagement force to the sealing lip 38 and the bushing end face 34 over the entire range of axial movement of the adjacent links 14, 16 to ensure the retention of lubricant in the lubricant holding chamber 35 and to prevent the ingress of contaminants therein.

The L-shaped base 40 of the seal ring 36 includes a generally axially extending cylindrical portion 44 and an integrally connected generally radially extending portion 46. The cylindrical portion defines a cylindrical surface 48 and an axially inner end 50, and the radially extending portion defines an axially inwardly facing end face 52, an axially outwardly facing end face 54, and a rounded, radially outer peripheral surface 56 extending therebetween defining a generally rounded end portion 58. The integral sealing lip 38 extends axially outwardly from the end face 54 of the radially extending portion 46. Moreover, a blended arcuate corner portion 60 connects the surface 48 and the end face 52 to define a seat 62 for the load ring 42.

As referred to above, the severe service environments to which seals of this type are exposed require the use of materials possessing physical properties which will enable the seals to withstand the effects of heat, cold, corrosion, abrasion, and high static and impact loadings. At the same time, it is highly advantageous to construct seals of a material possessing the additional properties of sealability, seal face stability, and a low coefficient of friction without introducing a bond between different materials of the assembly.

Dynamic laboratory and proving ground tests of end face seal assemblies having seal rings made from certain thermoplastic resins were conducted to relate the properties of coefficient of friction, tensile strength, hardness and the material's load and velocity capability (PV) as expressed by the product of the unit face load on the seal expressed in kilopascal (kPa) and the peripheral rubbing velocity expressed in meters per second [corresponding English units being pounds per square inch (psi) and feet per minute (fpm)] to seal wear rate and oil leak rate. These tests have shown that an end face seal assembly 10 having a seal ring 36 an integral sealing lip 38 can be expected to demonstrate superior service life, unexpectedly good sealing characteristics, and sufficient stiffness to maintain good seal face geometry under load when made from a material having a dry coefficient of dynamic friction on lapped hardened steel in the range of approximately 0.05 to approximately 0.35, a load/velocity relationship (PV) in the range of approximately 70.0 (2,000) to approximately 1576.0 (45,000), a tensile strength in the range of approximately 27.580 megapascal (MPa) (4,000 psi) to 206.850 MPa (30,000 psi), and a hardness in the range of approximately 45 to approximately 95 on the Shore D scale.

The end face seal assemblies 10 produced according to the present invention are highly unusual and differ from those known in the art in that they meet the requirements and possess the properties set forth above. Advantageously, the annular sealing member of seal ring 36 of each assembly is made from a thermoplastic resin selected from the group consisting of (a) a polyamide polymer, known commerically as 6/6 Nylon made by DuPont which contains approximately 18% polytetrafluoroethylene (PTFE) and approximately 2% silicone oil, and (b) an ultra-high molecular weight polyethylene. The preferred polyamide polymer is a condensation product made from the condensation of adipic acid and hexamethylene diamine having the chemical name hexamethyleneadipamide and having repeating polymer chain units having the chemical formula

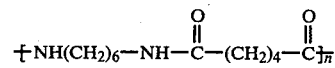

and having a molecular weight in the range 5,000 to 50,000, preferably about 18,000. It is also preferred that the ultra-high molecular weight polyethylene have repeating polymer chain units having the chemical formula

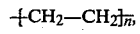

and having a molecular weight greater than about 1,000,000.

The above mentioned synthetic polymeric materials have been tested and found to be usable in practicing the present invention while many other tested materials have been found to be inadequate. However, it should be recognized that polymer chemistry is a highly developed art and that those skilled in the art, if given the functional requirements for the plastic material as set out above, can no doubt provide other synthetic plastic polymers having the desired properties. Hence, the invention should not be thought of as being limited to the particular materials just discussed.

INDUSTRIAL APPLICABILITY

With the parts assembled as set forth above, the end face seal assembly 10 of the present invention has application wherever it is desirable to provide a seal between two members having relative rotational and limited axial movement therebetween. One such application is in a track pin joint 12 in an endless track chain on track-type earthmoving vehicles.

In operation, the end face seal assembly 10 of the present invention is inserted into each track joint 12 of an endless track chain upon assembly of each pair of pivotally interconnected overlappping links 14, 16 and associated track pin 20 and cylindrical bushing 22. The seal assembly seals between the outer link 14 of the chain and the end face 34 of the bushing and cooperates therewith in defining the lubricant holding chamber 35.

The improved end face seal assembly 10 of the instant invention includes an annular sealing member or seal ring 36 having an integral sealing lip 38 for retaining lubricant in the chamber 35 and for preventing the ingress of contaminants therein, and a load ring 42 for urging the sealing lip into sealing engagement with the bushing end face 34.

The premature failure of track joints 12 due to delamination of the bond between the resilient seal ring and relatively stiff support ring of seal rings of prior art design is eliminated by the unique one-piece seal ring 36 of the instant invention. Seal rings made in accordance with the present invention are made from thermoplastic resins having the desired preselected properties, and which may be readily and economically formed by the injection molding process.

The thermoplastic resins used in forming the seal rings 36 of the present invention advantageously possess excellent low temperature friction properties which eliminate horsepower consuming drag. Further, they possess good sealing characteristics, low particle embedability, stability and stiffness to maintain good seal face geometry under load, and excellent corrosion and abrasion resistance over the range of track joint operating temperatures. Seal rings formed from these resins have demonstrated a projected service life of up to 10,000 service meter hours in an abrasive environment. These compositions include a polyamide polymer known commercially as 6/6 Nylon made by DuPont and containing approximately 18% polytetrafluoroethylene (PTFE) and approximately 2% silicone oil for lubrication purposes and ultra-high molecular weight polyethylene (UHMW-PE) made by PolyHi Company, among others.

While the present invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the scope thereof. Therefore, it is intended that the invention not be limited to the particular embodiments disclosed, but that the invention will include all embodiments falling within the scope of the appended claims.

I claim:

1. In a seal assembly (10) positioned between first and second relatively movable members (14, 22) for sealing therebetween and cooperating therewith in defining a lubricant holding chamber (35), the seal assembly (10) including an annular sealing member (36) having an integral sealing lip (38) for retaining lubricant in the chamber (35) and for preventing the ingress of contaminants therein, and load means (42) borne by the first member (14) for urging the sealing lip (38) into sealing engagement with the second member (22), the improvement comprising:
   an annular polymeric plastic sealing member (36) having a dry coefficient of dynamic friction on lapped hardened steel in the range of approximately 0.05 to approximately 0.35 and a load/velocity relationship (PV) in the range of approximately 70.0 (2,000) to approximately 1576.0 (45,000).

2. The seal assembly (10) of claim 1 wherein the annular sealing member (36) is a material with a tensile strength in the range of approximately 27.580 MPa (4,000 psi) to approximately 206.850 MPa (30,000 psi).

3. The seal assembly (10) of claim 1 wherein the annular sealing member (36) has a hardness in the range of approximately 45 to approximately 95 on the Shore D scale.

4. The seal assembly (10) of claim 1 wherein the annular sealing member (36) has a tensile strength in the range of approximately 27.580 MPa (4,000 psi) to approximately 206.850 MPa (30,000 psi) and a hardness in the range of approximately 45 to approximately 95 on the Shore D scale.

5. The seal assembly (10) of claim 1 wherein the annular sealing member (36) comprises a thermoplastic resin containing approximately 18% polytetrafluoroethylene and approximately 2% silicone oil.

6. The seal assembly (10) of claim 5 wherein the thermoplastic resin is a polyamide polymer.

7. The seal assembly (10) of claim 6 wherein the polyamide polymer is hexamethyleneadipamide having repeating polymer chain units having the formula

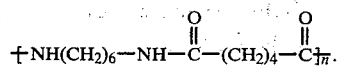

8. The seal assembly (10) of claim 1 wherein the annular sealing member (36) comprises ultra-high molecular weight polyethylene having repeating polymer chain units having the formula

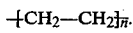

9. A track joint (12) comprising: first and second pivotally connected overlapping links (14, 16) coaxially mounted along a pivot axis (18) to a concentrically disposed track pin (20) and associated cylindrical bushing (22) respectively, the bushing (22) having a radially extending, axially inwardly facing end face (34), a counterbore (26) disposed in the first link (14) and defined by a radially extending, axially outwardly facing end face (28) and a cylindrical surface (30); an annular spacer member (24) surrounding the pin (20) and extending between the end faces (28, 34) of the counterbore (26) and the bushing (22); and a seal assembly (10) disposed in the counterbore (26) for retaining lubricant in the track joint (12) and for preventing the ingress of contaminants therein, the seal assembly (10) including an annular polymeric plastic sealing member (36) having an integral sealing lip (38), load means (42) borne by the first link (14) for urging the sealing lip (38) into sealing engagement with the bushing end face (34), said sealing member (36) having a dry coefficient of dynamic friction on lapped hardened steel in the range of approximately 0.05 to approximately 0.35 and a load/velocity relationship (PV) in the range of approximately 70.0 (2,000) to approximately 1576.0 (45,000).

10. The track joint (12) of claim 9 wherein the annular sealing member (36) is a material with a tensile strength in the range of approximately 27.580 MPa (4,000 psi) to approximately 206.850 MPa (30,000 psi).

11. The track joint (12) of claim 9 wherein the annular sealing member (36) has a hardness in the range of approximately 45 to approximately 95 on the Shore D scale.

12. The track joint (12) of claim 9 wherein the annular sealing member (36) has a tensile strength in the range of approximately 27.580 MPa (4,000 psi) to approximately 206.850 MPa (30,000 psi) and a hardness in the range of approximately 45 to approximately 95 on the Shore D scale.

13. The track joint (12) of claim 9 wherein the annular sealing member (36) comprises a thermoplastic resin containing approximately 18% polytetrafluoroethylene and approximately 2% silicone oil.

14. The track joint (12) of claim 13 wherein the thermoplastic resin is a polyamide polymer.

15. The track joint (12) of claim 14 wherein the polyamide polymer is hexamethyleneadipamide having repeating polymer chain units having the formula

16. The track joint (12) of claim 9 wherein the annular sealing member (36) comprises ultra-high molecular weight polyethylene having repeating polymer chain units having the formula

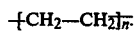

17. A seal assembly (10) positioned between first and second relatively movable members (14, 22) for sealing therebetween and cooperating therewith in defining a lubricant holding chamber (35) comprising:

an annular sealing member (36) having an integral sealing lip (38) for retaining lubricant in the chamber (35) and for preventing the ingress of contaminants therein, the annular sealing member (36) being of a thermoplastic resin selected from the group consisting of hexamethyleneadipamide containing approximately 18% polytetrafluoroethylene (PTFE) and approximately 2% silicone oil and ultra-high molecular weight polyethylene (UHMW-PE); and load means (42) borne by the first member (14) for urging the sealing lip (38) into sealing engagement with the second member (22).

* * * * *